(12) United States Patent
Malkin et al.

(10) Patent No.: US 11,029,847 B2
(45) Date of Patent: Jun. 8, 2021

(54) METHOD AND SYSTEM FOR SHARED DIRECT ACCESS STORAGE

(71) Applicant: HEWLETT PACKARD ENTERPRISE DEVELOPMENT LP, Houston, TX (US)

(72) Inventors: Kirill Malkin, Morris Plains, NJ (US); Steve Dean, Chippewa Falls, WI (US); Michael Woodacre, Sutton Benger (GB); Eng Lim Goh, Singapore (SG)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/353,413

(22) Filed: Nov. 16, 2016

(65) Prior Publication Data

US 2017/0139607 A1    May 18, 2017

Related U.S. Application Data

(60) Provisional application No. 62/255,832, filed on Nov. 16, 2015.

(51) Int. Cl.
*G06F 3/06* (2006.01)
*G06F 9/50* (2006.01)

(52) U.S. Cl.
CPC .......... *G06F 3/0607* (2013.01); *G06F 3/0635* (2013.01); *G06F 3/0685* (2013.01);
(Continued)

(58) Field of Classification Search
CPC .... G06F 3/0607; G06F 3/0635; G06F 3/0685; G06F 3/0688; G06F 9/5027; G06F 2209/509
See application file for complete search history.

(56) References Cited

U.S. PATENT DOCUMENTS 8,001,266 B1     8/2011  Gonzalez et al.
2010/0177562 A1*  7/2010  Chen ................... G11C 11/22
                                                365/171
(Continued)

FOREIGN PATENT DOCUMENTS

WO    WO 2017/087544    5/2017

OTHER PUBLICATIONS

PCT Application No. PCT/US2016/062316 International Search Report and Written Opinion dated Jan. 23, 2017.
(Continued)

*Primary Examiner* — David Yi
*Assistant Examiner* — Nicholas A. Paperno
(74) *Attorney, Agent, or Firm* — Hewlett Packard Enterprise Patent Department (57) ABSTRACT

In high performance computing, the potential compute power in a data center will scale to and beyond a billion-billion calculations per second ("Exascale" computing levels). Limitations caused by hierarchical memory architectures where data is temporarily stored in slower or less available memories will increasingly limit high performance computing systems from approaching their maximum potential processing capabilities. Furthermore, time spent and power consumed copying data into and out of a slower tier memory will increase costs associated with high performance computing at an accelerating rate. New technologies, such as the novel Zero Copy Architecture disclosed herein, where each compute node writes locally for performance, yet can quickly access data globally with low latency will be required. The result is the ability to perform burst buffer operations and in situ analytics, visualization and computational steering without the need for a data copy or movement.

12 Claims, 5 Drawing Sheets

(52) U.S. Cl.
CPC .......... *G06F 3/0688* (2013.01); *G06F 9/5027* (2013.01); *G06F 2209/509* (2013.01); *Y02D 10/00* (2018.01)

(56) References Cited

U.S. PATENT DOCUMENTS

| | | | |
|---|---|---|---|
| 2010/0241881 A1* | 9/2010 | Barsness | G06F 1/3203 |
| | | | 713/320 |
| 2013/0111077 A1 | 5/2013 | Gowravaram et al. | |
| 2013/0117766 A1* | 5/2013 | Bax | G06F 9/4405 |
| | | | 719/323 |
| 2014/0032766 A1 | 1/2014 | Raymond | |
| 2014/0032958 A1 | 1/2014 | Beck | |
| 2014/0068201 A1 | 3/2014 | Fromm | |
| 2014/0096143 A1 | 4/2014 | Abeles et al. | |
| 2014/0228005 A1* | 8/2014 | Huang | H04M 3/42068 |
| | | | 455/414.1 |
| 2014/0317206 A1 | 10/2014 | Lomelino et al. | |
| 2015/0067095 A1 | 3/2015 | Gopal et al. | |
| 2015/0081912 A1 | 3/2015 | Tan et al. | |

OTHER PUBLICATIONS

European Search Report and Search Opinion Received for EP Application No. 16867052.9, dated Oct. 2, 2019, 7 pages.

* cited by examiner

METHOD AND SYSTEM FOR SHARED DIRECT ACCESS STORAGE

CROSS-REFERENCE TO RELATED APPLICATIONS

This application claims the priority benefit of U.S. provisional patent application No. 62/255,832 filed Nov. 16, 2015, the disclosure of which is incorporated herein by reference.

BACKGROUND

Field of the Invention

The present invention relates to systems and methods for optimizing the processing of data in large computing systems. More specifically, the present invention improves the performance of computing systems by reducing the movement of data.

Description of Related Art

Driven by an ever-increasing demand to access and manipulate data, both the number of processors in a compute node and the number of compute nodes in a data center have increased dramatically in recent years. While this has caused the potential compute power within data centers to increase geometrically, other limiting factors prevent data centers from reaching processing rates near their maximum potential.

One factor that is preventing data centers from reaching their potential processing rates is a need for conventional tiered memory systems to move data from a primary memory tier to a secondary memory tier and back again. This may occur when a processor in a node moves data to a secondary memory when that processor does not need that data immediately. Later, when the processing node needs that data to perform additional calculations, that data must be retrieved (move or copy) from the secondary memory. In another scenario, the node with data may not have the optimal hardware configuration for a given step in the workflow, e.g. fabric connectivity, amount of local memory or presence of accelerators such as graphical processing units (GPUs), and the data needs to be moved to another node that is configured optimally. This movement of data causes processors in a processing system to spend less time performing calculations and more time retrieving (moving or copying) data. Another exacerbating factor that causes processors in compute nodes not to operate at their potential is that memories in secondary memory tiers frequently have slower access times than memory in a primary memory tier. As such, more time is lost when a processor retrieves data from a secondary memory tier instead of accessing it from a primary memory tier.

The movement and copying of data are also an issue in today's storage area networks (SANs) as controllers that communicate with storage devices to access, copy, and convert data when providing data to hosts or nodes of a SAN fabric. These SAN controllers are intermediaries between storage devices and host computers or nodes that communicate with data storage devices according to one protocol and communicate with hosts/nodes using a second protocol. To prevent single points of failure in a SAN, SANs typically include redundant SAN controllers. When SAN controllers retrieve data from a data storage device for a host or node, they copy requested data from one or more data storage devices and typically convert that data into protocol supported by the SAN. For example, hosts may communicate with SAN controllers using Fiber Channel and SAN controllers may communicate with data storage devices using block level commands. SAN architectures can be expensive to deploy and maintain, in part because they use multiple redundant controllers. SAN controllers also add latency because of how they copy and reorganize (convert) data.

This copying and movement of data is preventing high performance computing systems from reaching their potential. Soon the potential compute power in a data center will scale to and beyond a billion-billion calculations per second (i.e. to and beyond the "Exascale"). As the potential compute power of the data center increases, delays associated with copying and moving data will increase when conventional tiered memory architectures are used.

Other issues confronting the data center today include the power consumed by the movement of data and the power consumed when several copies discrete pieces of data are maintained in different memories. Regardless of whether data is moved for a long time or copied for temporary use, power and time are consumed by tasks that are not processing tasks. Power consumption in the data center could be reduced significantly if data were moved less frequently or not at all. Power consumption in the data center could also be reduced if a fewer number of copies of data were stored in the data center.

Another factor affecting the evolution of the data center are trends in data storage technology that have driven a need for greater bus transfer speeds. For example, the movement from parallel data storage communication interfaces to the use of data storage interfaces that use low voltage differential signal (LVDS) communication busses enabled host computers to communicate with disk drives with increased speed. One driving factor for this need for increased speed was the fact that the maximum disk data rate of disk drives increased to a point where the disk data rate soon would be faster than data rates supported by parallel data storage device interfaces. This drove the movement from parallel data storage device interfaces like the small computer systems interface (SCSI) and the AT attachment bus, commonly referred to as ATA or PATA to serial interfaces like serial attached SCSI (SAS) and serial ATA (SATA).

At the time when SAS and SATA interface technologies were being developed and deployed, FLASH memory began to compete with disk drives. The emergence of FLASH memory was driven by semiconductor memory fabrication technologies that reduced the size of FLASH memory cells. This, in turn, enabled disk drive like data storage capacities to be built into FLASH memory drives. These flash memory drives appeared to be and acted like fast disk drives. Since semiconductor memories, like FLASH, do not have moving parts like disk drives, FLASH memories could provide access to data faster than disk drives. This is especially true when host computers access data in a random fashion. Because of this, FLASH, memories also began to use LVDS interfaces such as SAS and SATA. At nearly the same time that serial data storage device interfaces were being developed, a need for speed also was threatening to limit the speed at which computer graphic data could be processed. Here again, a need for speed helped drive the development of serial communication interfaces that would allow host computer to communicate with graphics devices more rapidly. For example, peripheral component interconnect express (PCIe) interface is a LVDS interface that initially was used to attach graphics boards to computers using an interface native to a host computer. PCIe was also used to connect SAS and SATA controllers to host computers. With the emergence of PCie, companies that produced FLASH drives began to produce FLASH drives with native PCie interfaces. While trends in data storage device interface technologies and in host native computer interface technologies have begun to converge, the benefits of this convergence has only provided limited improvements in data center performance. This is because conventional data center architectures, such as tiered memory and legacy SAN storage architectures are not optimized to provide access to data at maximum speed. In summary, the movement to LVDS interfaces at both host computers and at data storage devices had increased the maximum data storage access speeds, yet latencies inherent in conventional data center architectures limit the performance of the data center. Since the efficiency of the data center has not kept pace with increases in potential compute power because, at least in part, of tiered memory and SAN architecture limitations, what are needed are systems and methods that minimize or eliminate the need to move and copy data. Systems and methods that improve energy efficiency of the data center and that eliminate or reduce latencies inherent in the architecture of the conventional data center. Furthermore, since the total cost of ownership of the data center is also important, future architectures of high computing systems should include fewer devices.

SUMMARY OF THE PRESENTLY CLAIMED INVENTION

The presently claimed invention includes systems and non-transitory computer readable storage media where methods of the presently claimed invention minimize the movement of data in the data center.

Methods consistent with the presently claimed invention allocate a processor to perform a computing function. The computing function may require the processor to perform series of tasks by accessing data stored in a non-volatile memory. First, information relating to the function may be received, next a processor is allocated, and then the processor accesses the non-volatile memory when performing a task associated with the function. During this process a first node associated with the processor may be directly connected the non-volatile memory over a switch. The switch may connect a signal at the first node with a compatible signal at the non-volatile memory when the first node accesses the non-volatile memory. These methods may also include many processors of the first node accessing non-volatile memory when several tasks are associated with the computing function, and may include processors at a second node executing tasks associated with the computing function. The second node may be connected to the non-volatile memory via the switch or another switch. When all tasks associated with the compute function are complete, an output associated with the function is generated. After the output is generated it may be accessible to an external computing device.

When methods of the presently claimed invention are implemented as a non-transitory computer readable storage medium, information related to a function is also received, next a processor is allocated, and then the processor accesses the non-volatile memory when performing a task associated with the function. During this process a first node associated with the processor may be directly connected the non-volatile memory over a switch. The switch may connect a signal at the first node with a compatible signal at the non-volatile memory when the first node accesses the non-volatile memory. These methods may also include many processors of the first node accessing non-volatile memory when several tasks are associated with the computing function, and may include processors at a second node executing tasks associated with the computing function. The second node may be connected to the non-volatile memory via the switch or another switch. When all tasks associated with the compute function are complete, an output associated with the function is generated. After the output is generated it may be accessible to an external computing device.

A system consistent with the presently claimed invention may include an interface that receives a function, a non-volatile memory, processors that are associated with a first node, processors that are associated with second node, and a switch that directly connects a signal associated with the first node to the non-volatile memory. Here again processors are allocated to perform tasks associated with the function and the first node and at the second node. The first node may be directly connected to the non-volatile memory over the switch. The switch may connect a signal at the first node with a compatible signal at the non-volatile memory when the first node accesses the non-volatile memory. Here again many processors may be located at the first node may access non-volatile memory when several tasks are associated with the computing function are performed. One or more processors at the second node may also execute tasks associated with the computing function. The second node may be connected to the non-volatile memory via the switch or another switch. When all tasks associated with the compute function are complete, an output associated with the function is generated. After the output is generated it may be accessible to an external computing device.

DETAILED DESCRIPTION

The present disclosure includes the novel "Zero Copy Architecture" (ZCA). In the ZCA, each compute node writes to local memory for performance, while maintaining the ability to access other memories that globally reside in the data center. The result is the ability to perform burst buffer operations and in situ analytics, visualization, and computational steering minimizing or eliminating the need for copying or moving data.

An example of an implementation of the ZCA is a system that includes a plurality of SGI® UV Shared Memory Systems, quantities of NVMe PCIe Non Volatile Memory (NVM) high-capacity cards, and PCIe switches. By embedding a high performance converged storage device, such as a NVM high-capacity card, within a high performance computing (HPC) system that includes sufficient numbers of high performance switches (i.e. PCIe switches), each node within a HPC system can have an individual high performance (i.e. PCIe) connection to a quantity of individual memory cards (i.e. NVM high-capacity cards). In such a system, the converged storage device is connected to processors in the HPC system more directly as compared to how storage devices are connected to processors in a conventional HPC system. Therefore, the converged storage device is capable of performing direct data transfers to the memories of said processors without conversion, rather than copying the data to and from the memories of intermediary nodes or using controllers that convert between communication protocols.

The resulting benefits are the capabilities to perform high performance data analysis (HPDA) on HPC output data or instrument output data while reducing capital expenditures (i.e. reducing Capex) and reducing operating expenses (i.e. reducing Opex). Such systems and methods reduce Capex by minimizing the copying of data (i.e. "zero copying of data") as well as eliminating intermediary nodes, and reduce Opex by reducing energy costs by lowering the total amount of energy consumed by minimizing or eliminating energy consumed when data is moved between memories. Systems and methods consistent with the present disclosure can also help save power by avoiding a need to power up other intermediary nodes to which data may otherwise be copied. Systems built according to the present disclosure do not use storage controllers. As mentioned previously, storage area network (SAN) controllers have significant drawbacks that include a need to deploy additional redundant SAN controllers, and the need for these SAN controllers to retrieve/copy data and convert that retrieved data. Systems fabricated according to the present disclosure include the ability to access data through different pathways without requiring redundant controllers. Instead, host computers or nodes may access data directly through switches. Since hosts or nodes may access data storage resources directly via various different switches (or sets of switches), systems built according to the present disclosure provide redundancy without requiring expensive redundant controllers that must copy and convert data. As such, systems built according to the present disclosure may operate with greater efficiency and speed while using less power as compared to other computing architectures. One unique aspect of the zero copy architecture (ZCA) of the present disclosure is that it is created by extending native busses of compute systems into a fabric by means of specific technologies. This connection technique enables data stored on non-volatile data storage devices to be accessed via a shared fabric as if those data storage devices were locally connected to each compute host or node that shares these native busses. As such, the ZCA architecture directly electrically connect hosts or nodes to data storage devices without relying on redundant storage controllers. The ZCA architecture, thus eliminates the need for host or nodes to logically connect to data storage through an intermediary device. The ZCA architecture also bypasses the need to copy data from the memory of the each local compute node to another place at the local compute node memory for transmission over a traditional network (such as a SAN). The ZCA architecture also prevents the need to copy data to other compute nodes (such as a storage server) for intermediate transitory holding until that other node can copy it to a shared data storage device. Because of this, the ZCA architecture removes the requirement to copy data from either an initial transitory holding area or prevents the need to move data to a transitory holding area while still making data stored at non-volatile data storage devices available to many other compute nodes for further processing. In other words, the ZCA architecture provides the advantages of a SAN (redundant shared data access), without the disadvantages of a SAN (additional hardware, additional data movement, data copying, and data conversion). The ZCA removes the "middle man" (storage controllers) that convert data from one protocol to another that are inherent in conventional SAN fabrics, while providing the benefits of lower capital expenditures, faster access to data (reduced latency), and lower total cost of ownership (via reduced power consumption, smaller footprint, and reduced cooling requirements).

Virtually any compute node that includes a PCIe interface may be adapted to form a ZCA system consistent with certain embodiments of the present disclosure. As such, systems and methods of the present disclosure may improve the performance and efficiency of existing data centers simply by updating those HPC systems to include memories, switches, and software consistent with the present disclosure.

NVM high-capacity cards may include memory of any non-volatile memory type including, yet not limited to, FLASH memory, racetrack memory, phase-change memory, and ferroelectric random access memory (FRAM). When NVM cards are connected to numerous processor sockets and switches, the switches may provide each processor in each processor socket with the ability to connect to any NVM card in a HPC system. Note that a processor socket may include one or more discrete integrated circuits or multi-chip modules that contain a plurality of processors. In certain instances, an HPC system may include a plurality of processor sockets and many NVM cards that are directly interconnected by a switching network contained within one or more computer chassis. Switches used in an HPC system consistent with the present disclosure may be included in an application specific integrated circuit (ASIC) or in a field programmable gate array (FPGA). Processors associated with a node may include resident memory out of which program code is executed. Alternatively or additionally, program code may be executed by a processor out of a NVM.

Figure 1:
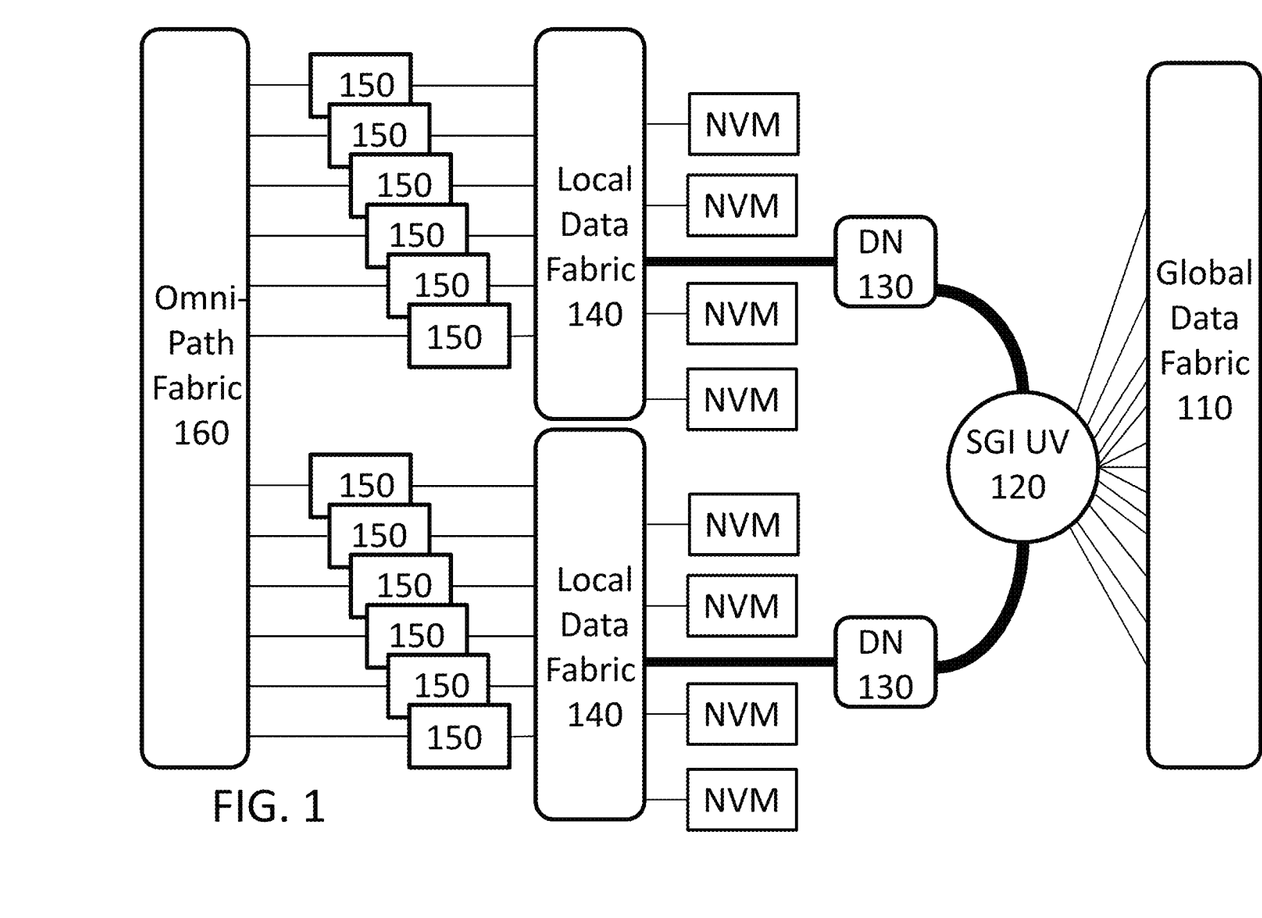
FIG. 1 illustrates various aspects of the technologies related to the present disclosure.

FIG. 1 illustrates various aspects of the technologies related to the present disclosure. FIG. 1 shows an extreme scale early prototype High Performance Computing (HPC) system that has the capability of removing latency related to swapping data in and out of a slower memory tier. FIG. 1 includes data nodes DN 130 connected to a global data fabric 110 (such as an SCI NUMALINK™) through SGI UV 120 interconnections. The global data 110 fabric of FIG. 1 may include a plurality of switches capable of connecting nodes, such as data nodes DN 130 through a low latency direct connection with other nodes. FIG. 1 includes a plurality of local data fabric switches 140 that may be used to connect data nodes DN 130 or to connect compute nodes 150 directly to non-volatile memories NVM. A non-volatile memory NVM may be connected to data nodes DN 130 or to compute nodes 150 through a single switch. FIG. 1 also includes an Omni-path fabric 160. Omni-path fabric 160 may be used to connect compute nodes 150 to each other or to other resources in a data center. Global data fabric 110 may be used to connect data nodes 130 to other computing resources. An overall HPC system may include two or more HPC systems of FIG. 1 connected to each other over the global data fabric 110. As such, HPC systems consistent with the present disclosure can scale while still minimizing a number of hops required to access data anywhere in a globally addressable memory space.

Figure 2:
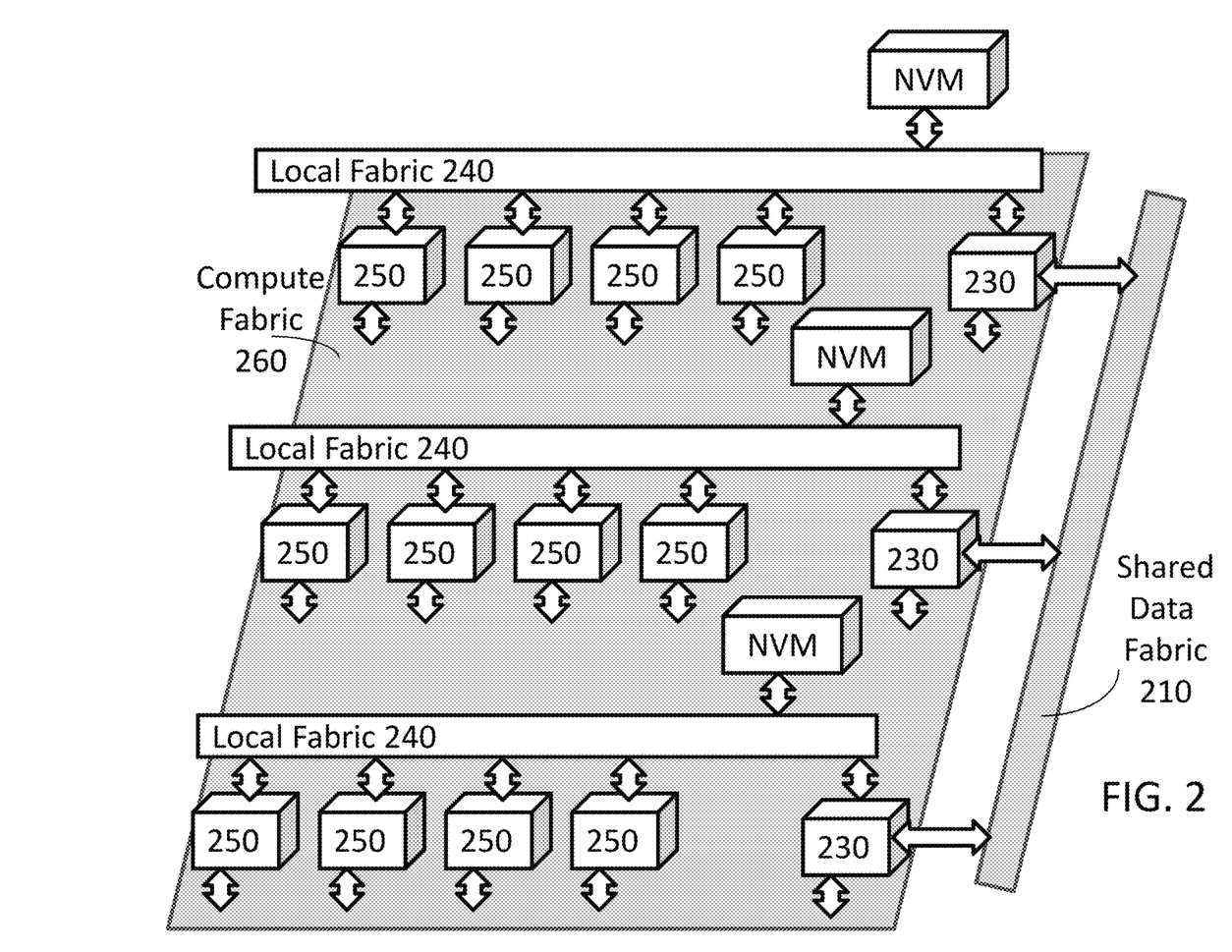
FIG. 2 illustrates a high performance computing (HPC) system configuration consistent with the present disclosure.

FIG. 2 illustrates a high performance computing (HPC) system configuration consistent with the present disclosure. The HPC system of FIG. 2 may include all of the components illustrated in FIG. 1. FIG. 2 includes shared data fabric 210, data nodes 230, non-volatile memory NVM, compute nodes 250, and a compute fabric 260. The shared data fabric 210 of FIG. 2 may also be a global data fabric, like the global data fabric 110 of FIG. 1. The compute fabric 260 of FIG. 2 may also be equivalent to the Omni-path fabric 160 of FIG. 1.

A Local fabric of the present disclosure may correspond to a computer system interconnect based on a local bus technology, such as, for example: PCI Express (PCIe) or Express Fabric by Broadcom.

A compute fabric of the present disclosure may correspond to a high-performance computing (HPC) interconnect or a computer networking interconnect that may be optimized to carry application messages (MPI/PGAS) with a low or with a lowest possible latency. Examples of compute fabrics of the present disclosure include yet are not limited to InfiniBand, OmniPath, etc. In certain instances, compute fabrics may also carry filesystem data between computer memory and a storage system.

A data fabric of the present disclosure may be a computer system interconnect designed to carry filesystem data between computer memory and storage devices. Typically, data fabrics of the present disclosure will not need to transfer messages from application programs. As such, data fabrics may be designed not to carry messages relating to application programs.

In certain instances, data fabrics consistent with the present disclosure may include or use computer hardware typically associated with a local fabric. As such, data fabrics of the present disclosure may be built using PCI Express (PCIe) or Express Fabric by Broadcom. Alternatively, data fabrics of the present disclosure may include proprietary hardware or use proprietary protocols.

Data nodes 230 of FIG. 2 may communicate through local fabric 240 when communicating with non-volatile memory NVM. Similarly compute nodes 250 may communicate with non-volatile memory NVM directly with minimal delay. FIG. 2 also shows data nodes 230 and compute nodes 250 communicating over compute fabric 260. The various double arrows connecting different elements in FIG. 2 illustrate different elements that may communicate over the shared fabric 210, the local fabric 240, or the compute fabric 260 of FIG. 2.

Local fabric 240 may also be configured such that any of a plurality of non-volatile memories NVM may communicate with any compute node 250 or with any data node 230 in a HPC system. The shared data fabric 210 may connect to other components of an HPC system, including, yet not limited to other chassis that contain components similar to those illustrated in FIG. 2. Compute nodes 250 may also communicate with each other or with other resources over compute fabric 260. Shared data fabric 210, local fabric 240, and compute fabric 260 may also include switches that directly connect different components of an HPC system together with minimal latency. Switch configurations in one or any of the fabrics of FIG. 2 may be implemented such that any component in the HPC system of FIG. 2 are separated by only one hop, by one switch/switch set, for example. In such an instance, each individual signal included in a PCIe interface may connect a node to a non-volatile memory card through a single individual switch or switch set, where a set of discrete switches connect individual signals on the PCIe interface of the node to a compatible signal at the non-volatile memory.

The shared data fabric 210 of FIG. 2 may communicate with other similarly configured HPC systems or groups of HPC nodes. An HPC system may be organized such that a single computer chassis contains all of the memory that a processor is capable of directly addressing. For example, a processor capable of directly addressing an Exabyte of memory may be included in a chassis that also includes an Exabyte of memory.

The structure of the HPC system of FIG. 1 and FIG. 2 may eliminate the need for one or more tiers of data storage in a HPC system. In conventional computer systems, data related to a processing task may be temporarily stored in a memory that has a greater latency than a first tier cache memory of a processor for use by the processor at a later time. In such systems, the act of moving data out of and back into different memories causes delay (lost performance) and increases power consumption.

Systems and methods consistent with the present disclosure prevent bottlenecks associated with tired memory architectures by adding a sufficient number of switches that directly connect nodes to non-volatile high-speed memory. The present technology removes at least one memory tier and eliminates the need to swap data into and out of another memory. For example, commonly used slower buffer memory that temporarily stores data in a second level cache can be eliminated from the system architecture by having all memory equally accessible over virtually only one hop (i.e. one switch/switch set). HPC systems consistent with the present disclosure flatten the structure of the memory where all memory is effectively local even when it is globally addressable by the HPC system. Such systems and structures will greatly increase the performance of systems executing tasks related to high performance data analysis and computing.

Methods consistent with the present disclosure may optimize the placement of data close to nodes that perform tasks associated with a function. For example, data associated with processing tasks of a given function or series of tasks may be placed in local memory that is accessible to any processor in a set of processors of a node. The set of processors allocated to such a given function may be able to access data using a single hop (i.e. through a single switch or set of switches). When data processing associated with the given function is complete, resultant data may be generated, communicated to a user, or be stored in a separate globally accessible data repository.

Figure 3:
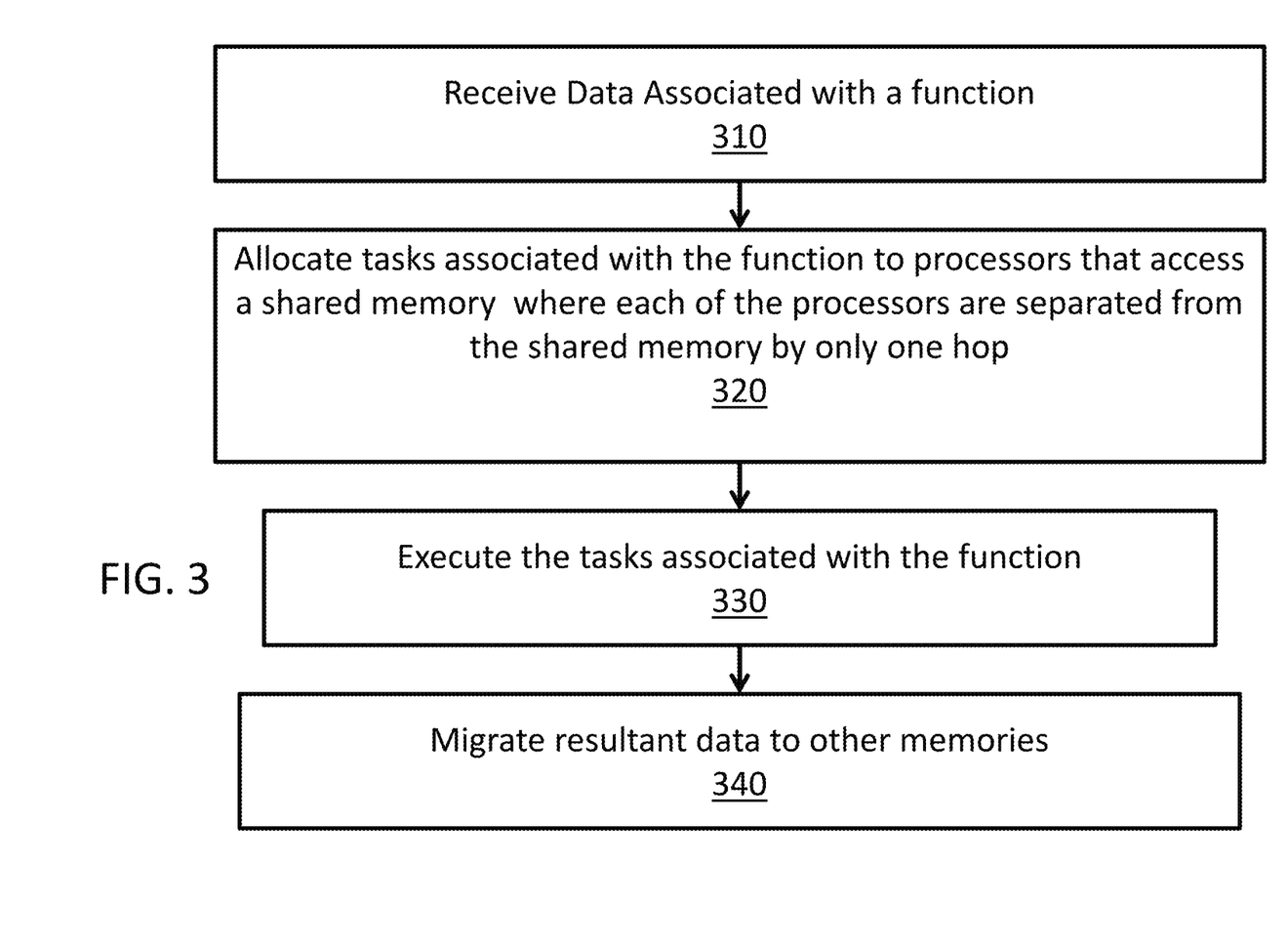
FIG. 3 illustrates a method for optimizing the performance of an HPC system.

FIG. 3 illustrates a method for optimizing the performance of an HPC system. In step 310 of FIG. 3 data associated with a function is received. Next in step 320 tasks associated with the function are allocated to processors that are configured to access a shared memory that is accessible to each of the allocated processors through one switch or set of switches such that each of the allocated processors (or processing nodes) are just one hop away from the non-volatile memory. Step 330 is a step where the tasks associated with the function are performed. Finally, in optional step 340, resultant data related to the function may be migrated to other memories or be provided to a user computing device.

Figure 4:
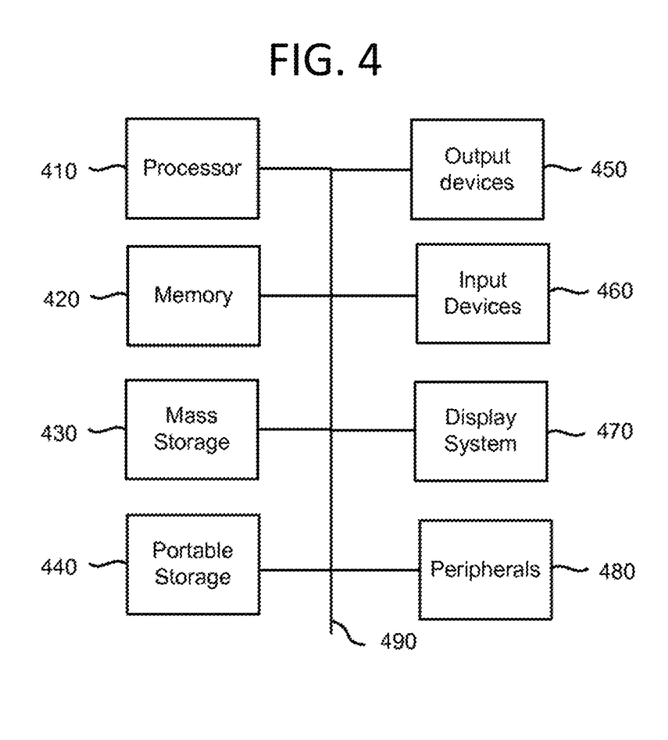
FIG. 4 illustrates an exemplary computing system that may be used to implement all or a portion of a device for use with the present technology.

FIG. 4 illustrates an exemplary computing system that may be used to implement all or a portion of a device for use with the present technology. The computing system 400 of FIG. 4 includes one or more processors 410 and memory 420. Main memory 420 stores, in part, instructions and data for execution by processor 410. Main memory 420 can store the executable code when in operation. The system 400 of FIG. 4 further includes a mass storage device 430, portable storage medium drive(s) 440, output devices 450, user input devices 460, a graphics display 470, and peripheral devices 480.

The components shown in FIG. 4 are depicted as being connected via a single bus 490. However, the components may be connected through one or more data transport means. For example, processor unit 410 and main memory 420 may be connected via a local microprocessor bus, and the mass storage device 430, peripheral device(s) 480, portable storage device 440, and display system 470 may be connected via one or more input/output (I/O) buses.

Mass storage device 430, which may be implemented with a magnetic disk drive, solid state drives, an optical disk drive or other devices, may be a non-volatile storage device for storing data and instructions for use by processor unit 410. Mass storage device 430 can store the system software for implementing embodiments of the present invention for purposes of loading that software into main memory 420.

Portable storage device 440 operates in conjunction with a portable non-volatile storage medium, such as a FLASH thumb drive, compact disk or Digital video disc, to input and output data and code to and from the computer system 400 of FIG. 4. The system software for implementing embodiments of the present invention may be stored on such a portable medium and input to the computer system 400 via the portable storage device 440.

Input devices 460 provide a portion of a user interface. Input devices 460 may include an alpha-numeric keypad, such as a keyboard, for inputting alpha-numeric and other information, or a pointing device, such as a mouse, a trackball, stylus, or cursor direction keys. Additionally, the system 400 as shown in FIG. 4 includes output devices 450. Examples of suitable output devices include speakers, printers, network interfaces, and monitors.

Display system 470 may include a liquid crystal display (LCD) or other suitable display device. Display system 470 receives textual and graphical information, and processes the information for output to the display device.

Peripherals 480 may include any type of computer support device to add additional functionality to the computer system. For example, peripheral device(s) 480 may include a modem or a router.

The components contained in the computer system 400 of FIG. 4 are those typically found in computer systems that may be suitable for use with embodiments of the present invention and are intended to represent a broad category of such computer components that are well known in the art. Thus, the computer system 400 of FIG. 4 can be a personal computer, hand held computing device, telephone, mobile computing device, workstation, server, minicomputer, mainframe computer, or any other computing device.

The computer can also include different bus configurations, networked platforms, multi-processor platforms, etc. Various operating systems can be used including Unix, Linux, Windows, Macintosh OS, Android, and other suitable operating systems.

Figure 5:
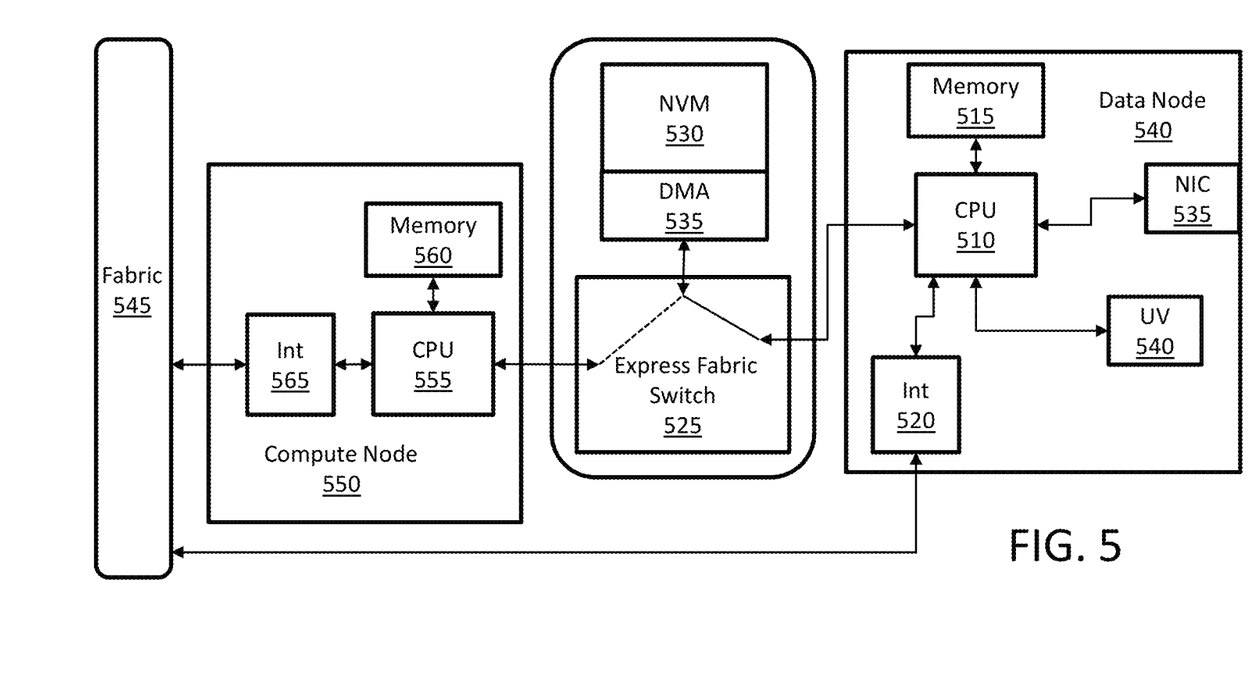
FIG. 5 illustrates an exemplary embodiment of the present disclosure where individual processors or processor sockets may queue an image of operating system software for use by the individual processor or processor socket where each processor socket may include multiple processing cores.

FIG. 5 illustrates an exemplary embodiment of the present disclosure where individual processors or processor sockets may queue an image of operating system software for use by the individual processor or processor socket where each processor socket may include multiple processing cores. Systems built according to the present disclosure may allow each processor or each processing socket in a node to cache a set of operating system (OS) instructions. These OS instructions may enable a set of one or more processors at a processing socket to access data and perform calculations without requiring the set one or more processors at the processing socket to coordinate tasks with other processing sockets at the node. Because of this, each individual set of processors at one or more nodes may operate independently. As such, one or more instances of operating system software may be distributed between different processing sockets in one or more nodes. This would enable each of the different processor sets to execute OS instructions and access non-volatile memory with minimal latencies. For example, when a set of processors at a first processing socket operate independently, they do not have to wait for processors at other processing sockets to finish tasks before they can continue processing. As such, the systems and method consistent with the present disclosure may perform computations more efficiently than other solutions.

FIG. 5 includes a processor CPU 510 at data node 505. CPU 510 may cache operating system instructions in memory 515. CPU 510 may communicate over interface 520 and over cluster fabric via interface 520. CPU 510 may also communicate over network interface controller 535 and over interface UV 540. Interface UV 540 may be an interface consistent with SCI UV (Ultra-Violet) interface.

FIG. 5 includes non-volatile memory NVM 530 and an express fabric switch 525 over which NVM 530 may be accessed using direct memory accesses DMA 535. FIG. 5 also includes compute node 550, processor CPU 555, memory 560, and interface 565.

In certain instances, fabric 545 may be a fabric similar to the Omni-Path fabric 160 of FIG. 1. Fabric 545 may be used for inter-node communications and may be used to transfer information between data node 540 and compute node 550, where these inter-node communications may be passed over interface 520, fabric 545, and interface 565. In certain instances data node 540 may perform steps relating to identifying or enumerating non-volatile memory devices, including NVM 530. Operating system software at data node 540 may include a complete image of a non-volatile memory device driver in memory 515. For example, CPU 510 at node 540 may identify NVM device 530 by sending communications over express switch 525 to NVM 530.

Data node 540 may also provide compute node 550 with operating system software, such as a device driver for accessing NVM 530. A device driver provided to compute node 550 may not include all of the functionality of the device driver stored in memory 515 of data node 540. For example, device driver software at data node 540 may include instructions that identify or enumerate data storage devices, where device driver software sent to compute node 550 may not necessarily include data storage device initialization or enumeration instructions. Data node 540 may also provide compute node 550 with information that provides compute node 550 with information that identifies individual data storage devices, such as NVM 530. The provisioning of device driver software or related information may be sent from data node 540 via interface 520, fabric 545, and interface 565 for storage in memory 560 at compute node 550. In such instances, fabric 545 may be optimized for inter-node communications and an express fabric connecting nodes to non-volatile memory may be optimized for data transfer. An express fabric may be the local data fabric 140 of FIG. 1. Furthermore, the global data fabric 110 of FIG. 1 may also be compatible with local data fabric or be included as an extension of a local data fabric with similar architectural features.

Another reason for including different device driver functionality at a data node versus compute nodes is that the system architecture may not allow more than one node to configure a non-volatile memory. As such, data node 540 may identify and configure NVM 530, where compute nodes may not. Data node 540 may also coordinate the allocation of processors to queues at compute nodes that store images of operating system software used by individual processors or processor sockets at a node.

In such a manner, data node 540 could help orchestrate workloads assigned to individual processor sockets and compute nodes, where each processing socket could cache operating system device driver software when independently accessing non-volatile memory over an express fabric, such as express fabric 525.

In certain instances, compute nodes 550 may send a request to data node 540 regarding allocating memory (i.e. allocating a queue) for accessing NVM 530. As such, compute nodes 550 may be assigned jobs by nodes other than data node 540, yet data node 540 may help coordinate and configure device driver queues at compute nodes 550 when required. In such an instance, compute nodes 550 may identify an address range that is available for allocation out of memory 560 for the queue. This address range information may be sent to data node 540. That available memory may then be allocated to store information for accessing NVM 530. The queue may be comprised of memory that spans memory associated with the identified address range.

Once the queue is initialized at compute node 550, an acknowledgement from compute node 550 may inform data node 540 that compute node 550 is prepared to access NVM 530. Data node 540 may also store information relating to the allocated queue in a mapping of data queues. This mapping may include the identified address ranges where queues are located at various processor sockets of various compute nodes 550. At a later point in time when compute node 550 no longer needs to access NVM 530, compute node 550 may de-allocate memory associated with the queue. Compute node 550 may then send a message to data node 540 indicating that the queue has been terminated, and data node 540 may then delete information in the queue mapping relating to compute node 550. In such an instance, data node 540 may also configure devices or switches, such as express fabric switch 525 or NVM 530.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method comprising:
receiving information relating to processing a function;
allocating a first processor of a first node to perform a first task associated with the function, wherein the first node is separated from a non-volatile memory by a switch included in a first fabric, the switch being directly connected to the non-volatile memory by a local bus interface of the non-volatile memory;
when performing the first task, transferring, by the first processor through the first fabric using the switch, data from a node memory of the first node through a local bus interface of the first node to the non-volatile memory via direct memory access (DMA) of the non-volatile memory by the first processor; allocating a second processor of a second node to perform a second task associated with the function, wherein the second node is separated from the non-volatile memory by the switch or by another switch included in the first fabric, the another switch being directly connected to the non-volatile memory;
when performing the second task, receiving, by the second processor through a local bus interface of the second node and through the first fabric using the switch or the another switch, data into a node memory of the second node from the non-volatile memory via DMA of the non-volatile memory by the second processor; communicating, between the second node and the first node, through a second fabric of a type different from the first fabric, wherein the communicating through the second fabric is between a fabric interface of the first node and a fabric interface of the second node; and
generating an output of the function, wherein the output of the function is accessible by an external computing device after the output is generated,
wherein the allocating of the first processor to perform the first task and the allocating of the second processor to perform the second task are by a data node,
sending, by the data node to the first node and the second node, a device driver for accessing the non-volatile memory;
executing the device driver at the first node and the second node when accessing the non-volatile memory in performing the first task and the second task, respectively;
executing, by the data node, a further device driver, wherein the device driver sent to the first node and the second node has less functionality than the further device driver; and
configuring, by the further device driver executed by the data node, the non-volatile memory.

2. The method of claim 1, wherein the non-volatile memory is a flash memory.

3. The method of claim 1, wherein the method is performed in a system that includes a plurality of switches including the switch and the another switch, the plurality of switches directly connecting a plurality of compute nodes and one or more data nodes to the non-volatile memory.

4. The method of claim 1, wherein each of the local bus interface of the first node, the local bus interface of the second node, and the local bus interface of the non-volatile memory is a Peripheral Component Interconnect Express (PCIe) interface.

5. The method of claim 3, wherein the one or more data nodes receive the information relating to the processing of the function.

6. The method of claim 3, wherein the one or more data nodes communicate the output of the function.

7. The method of claim 1, wherein the device driver sent to the first node and the second node is without a functionality of configuring the non-volatile memory.

8. The method of claim 1, further comprising:
receiving, by the data node, a request from the first node regarding allocating memory for accessing the non-volatile memory; and
receiving, by the data node, a request from the second node regarding allocating memory for accessing the non-volatile memory.

9. The method of claim 1, wherein the local bus interface of the first node and the local bus interface of the second node are connected to the first fabric, and the fabric interface of the first node and the fabric interface of the second node are connected to the second fabric.

10. A non-transitory computer readable storage medium comprising instructions that upon execution cause a coordinator node to:

receive information relating to processing a function;

allocate a first processor of a first node to perform a first task associated with the function, wherein the first node is separated from a non-volatile memory by a switch included in a first fabric, the switch being directly connected to the non-volatile memory by a local bus interface of the non-volatile memory, and the first processor when performing the first task transfers, through the first fabric using the switch, data from a node memory of the first node through a local bus interface of the first node to the non-volatile memory via direct memory access (DMA) of the non-volatile memory by the first processor; allocate a second processor of a second node to perform a second task associated with the function, the second node separated from the non-volatile memory by the switch or by another switch included in the first fabric, the another switch being directly connected to the non-volatile memory, wherein the second processor when performing the second task receives, through a local bus interface of the second node and through the first fabric using the switch or the another switch, data into a node memory of the second node from the non-volatile memory via DMA of the non-volatile memory by the second processor, and wherein the second node and the first node are to communicate with each other through a second fabric of a different type from the first fabric, the communicating through the second fabric being between a fabric interface of the first node and a fabric interface of the second node;

send, from the coordinator node to the first node and the second node, a device driver for accessing the non-volatile memory, to cause execution of the device driver at the first node and the second node when accessing the non-volatile memory in performing the first task and the second task, respectively;

execute, at the coordinator node, a further device driver, wherein the device driver sent to the first node and the second node has less functionality than the further device driver; and configure, by the further device driver executed by the coordinator node, the non-volatile memory.

11. The non-transitory computer readable storage medium of claim 10, wherein the non-volatile memory is a flash memory.

12. The non-transitory computer readable storage medium of claim 10, wherein the device driver sent to the first node and the second node is without a functionality of configuring the non-volatile memory.

\* \* \* \* \*